(12) United States Patent
Ellis et al.

(10) Patent No.: US 10,179,424 B2
(45) Date of Patent: Jan. 15, 2019

(54) DIAGNOSTIC SYSTEM FOR MEASURING ACCELERATION OF A DEMOLITION HAMMER

(71) Applicant: Caterpillar Inc., Peoria, IL (US)

(72) Inventors: Steven B. Ellis, Hewitt, TX (US);
Dimitar Dostinov, Hewitt, TX (US);
Bart A. Fisher, Roanoke, IL (US)

(73) Assignee: Caterpillar Inc., Deerfield, IL (US)

( * ) Notice: Subject to any disclaimer, the term of this patent is extended or adjusted under 35 U.S.C. 154(b) by 433 days.

(21) Appl. No.: 14/924,806

(22) Filed: Oct. 28, 2015

(65) Prior Publication Data
US 2017/0120478 A1 May 4, 2017

(51) Int. Cl.
| | | |
|---|---|---|
| *B28D 1/26* | (2006.01) | |
| *B25D 17/06* | (2006.01) | |
| *E02F 3/96* | (2006.01) | |
| *G01P 15/08* | (2006.01) | |
| *E02F 9/26* | (2006.01) | |

(52) U.S. Cl.
CPC ............ *B28D 1/26* (2013.01); *B25D 17/06* (2013.01); *E02F 3/966* (2013.01); *E02F 9/267* (2013.01); *G01P 15/0802* (2013.01); *B25D 2250/141* (2013.01); *B25D 2250/221* (2013.01); *E02F 9/264* (2013.01)

(58) Field of Classification Search
CPC .......... G01P 15/0802; B25D 2250/141; B25D 2250/221; E02F 9/264; B28D 1/26
See application file for complete search history.

(56) References Cited

U.S. PATENT DOCUMENTS

| | | | |
|---|---|---|---|
| 4,699,223 A | 10/1987 | Noren | |
| 5,410,905 A | 5/1995 | Karani et al. | |
| 5,581,013 A | 12/1996 | Frederick | |
| 6,170,317 B1 | 1/2001 | Juuri et al. | |
| 6,510,902 B1 | 1/2003 | Prokop et al. | |
| 8,704,507 B2 | 4/2014 | Oksman et al. | |
| 2012/0223833 A1* | 9/2012 | Thomas | G06F 19/3418 340/539.12 |
| 2012/0293115 A1* | 11/2012 | Ramsesh | G01D 5/2013 320/108 |

(Continued)

FOREIGN PATENT DOCUMENTS

| | | |
|---|---|---|
| DE | 102009045758 | 4/2011 |
| DE | 102013211242 | 12/2014 |

(Continued)

*Primary Examiner* — R. A. Smith
*Assistant Examiner* — John M Royston
(74) *Attorney, Agent, or Firm* — Miller, Matthias & Hull

(57) ABSTRACT

A diagnostic system for measuring acceleration of a piston of a reciprocating hammer is disclosed. The diagnostic system may include a magnet configured to induce, via electromagnetic induction and based on a movement of the piston, an electric current in a conductor. The diagnostic system may include a capacitor electrically coupled to the conductor and configured to store electric power based on the electric current induced by the magnet. The diagnostic system may include an accelerometer configured to measure an acceleration of the piston. The diagnostic system may include a communication device powered by the capacitor and configured to output a signal that identifies the acceleration measured by the accelerometer.

18 Claims, 6 Drawing Sheets

(56) References Cited

U.S. PATENT DOCUMENTS

| | | | |
|---|---|---|---|
| 2014/0060932 A1 | 3/2014 | Connell | |
| 2014/0116071 A1* | 5/2014 | Jung | E21B 47/011 62/56 |
| 2015/0161830 A1* | 6/2015 | Lenhardt | G01K 13/00 701/30.5 |
| 2015/0333598 A1* | 11/2015 | Conticchio | F03G 5/06 290/1 R |
| 2016/0115782 A1* | 4/2016 | Martinez | E21B 41/0085 340/853.3 |

FOREIGN PATENT DOCUMENTS

| | | |
|---|---|---|
| WO | 2009148376 | 12/2009 |
| WO | 2011077001 | 6/2011 |

\* cited by examiner

DIAGNOSTIC SYSTEM FOR MEASURING ACCELERATION OF A DEMOLITION HAMMER

TECHNICAL FIELD

The present disclosure relates generally to a reciprocating hammer and, more particularly, to a diagnostic system for a reciprocating hammer.

BACKGROUND

A reciprocating hammer may be used on a work site to break up hard objects, such as rocks, concrete, asphalt, frozen ground, or the like. The reciprocating hammer may be mounted to a machine, such as an excavator, a backhoe, or the like. Alternatively, the reciprocating hammer may be included in a hand-operated machine, such as a jackhammer. The reciprocating hammer may include a piston configured to repeatedly strike a work tool via reciprocating movement inside a housing. The work tool may extend from the housing to engage and break up the hard objects. During operation of the reciprocating hammer, various components of the reciprocating hammer may wear out or break down. This may cause an acceleration of the piston to decrease over time, which may reduce the effectiveness of the reciprocating hammer. Such reduced acceleration may indicate that maintenance should be performed to repair the reciprocating hammer. Additionally, or alternatively, the reduced acceleration may indicate that the reciprocating hammer is being operated in a less-than-optimal manner (e.g., the reciprocating hammer is being operated at an angle other than perpendicular to a work surface).

However, an operator of the reciprocating hammer may not know the acceleration of the piston, and may rely on feel to determine when to perform maintenance on the reciprocating hammer or to determine an appropriate angle for operating the reciprocating hammer. Relying on feel or expertise of the operator may be unreliable. Alternatively, the operator may adhere to a maintenance schedule, which may also be unreliable and may cause maintenance to be performed more often or less often than necessary, thereby increasing cost and/or reducing the effectiveness of the reciprocating hammer.

One attempt to detect a need for maintaining a hydraulic hammer is disclosed in U.S. Pat. No. 6,170,317 that issued to Juuri on Jan. 9, 2001 ("the '317 patent"). In particular, the '317 patent discloses an arrangement for indicating a need for maintaining a hydraulic breaking apparatus, which includes means for measuring at least one parameter describing the loading of the hydraulic breaking apparatus. The '317 patent also discloses an indicator which is specific for each hydraulic breaking apparatus and which is arranged to indicate visually, for example by means of LED lamps, that the parameter measured has exceeded a limit value determined in advance for maintenance.

While the arrangement of the '317 patent may be used to measure a parameter in association with maintaining a hydraulic breaking apparatus, the arrangement of the '317 patent includes an indicator, placed in connection with the hydraulic breaking apparatus, that provides a visual indication that the measured parameter exceeds a limit value determined in advance for maintenance. Such an indicator, fastened directly to the hydraulic breaking apparatus, may be difficult for an operator to see during operation of the breaking apparatus. Furthermore, the arrangement of the '317 patent may use a separate power source that can be charged in connection with each maintenance. Such a power source may limit the duration during which the arrangement is capable of measuring the parameter.

The diagnostic system of the present disclosure solves one or more of the problems set forth above and/or other problems in the art.

SUMMARY

In one aspect, the present disclosure is related to a reciprocating hammer. The reciprocating hammer may include a piston configured for reciprocating movement within a cylinder housing. The reciprocating hammer may include a magnet configured to induce, via electromagnetic induction and based on the reciprocating movement of the piston, an electric current in a conductor. The reciprocating hammer may include an energy storage device electrically coupled with the conductor and configured to store electrical energy based on the electric current induced by the magnet. The reciprocating hammer may include a sensor configured to measure a parameter associated with the reciprocating hammer, and a communication device electrically coupled with the energy storage device and configured to output a signal indicative of the parameter.

In another aspect, the present disclosure is related to a diagnostic system. The diagnostic system may include a magnet configured to induce, via electromagnetic induction and based on a reciprocating movement of a piston, an electric current in a conductor. The diagnostic system may include an energy storage device electrically coupled to the conductor and configured to store electrical energy based on the electric current induced by the magnet. The diagnostic system may include a sensor configured to measure a parameter associated with the piston. The diagnostic system may include a communication device powered by the energy storage device and configured to output a wireless signal indicative of the parameter associated with the piston.

In yet another aspect, the present disclosure is related to a diagnostic system for a reciprocating hammer that includes a piston. The diagnostic system may include a magnet configured to induce, via electromagnetic induction and based on a movement of the piston, an electric current in a conductor. The diagnostic system may include a capacitor electrically coupled to the conductor and configured to store electric power based on the electric current induced by the magnet. The diagnostic system may include an accelerometer configured to measure an acceleration of the piston. The diagnostic system may include a communication device powered by the capacitor and configured to output a signal that identifies the acceleration measured by the accelerometer.

DETAILED DESCRIPTION

A reciprocating hammer may be used to break up hard objects, such as rocks, concrete, asphalt, frozen ground, or the like. The reciprocating hammer may include a piston configured for reciprocating movement. The piston may be configured to strike a work tool to impact and break up the hard objects. After repeated operation of the reciprocating hammer, various components of the reciprocating hammer may need maintenance. Implementations described herein include a diagnostic system to assist with determining when to perform maintenance on the reciprocating hammer. Furthermore, the piston may be operated at an angle, in association with a work surface, that results in more effective or less effective operation of the reciprocating hammer depending on the angle. Implementations described herein include a diagnostic system to assist with determining an effective angle of operation for the reciprocating hammer.

Figure 1:
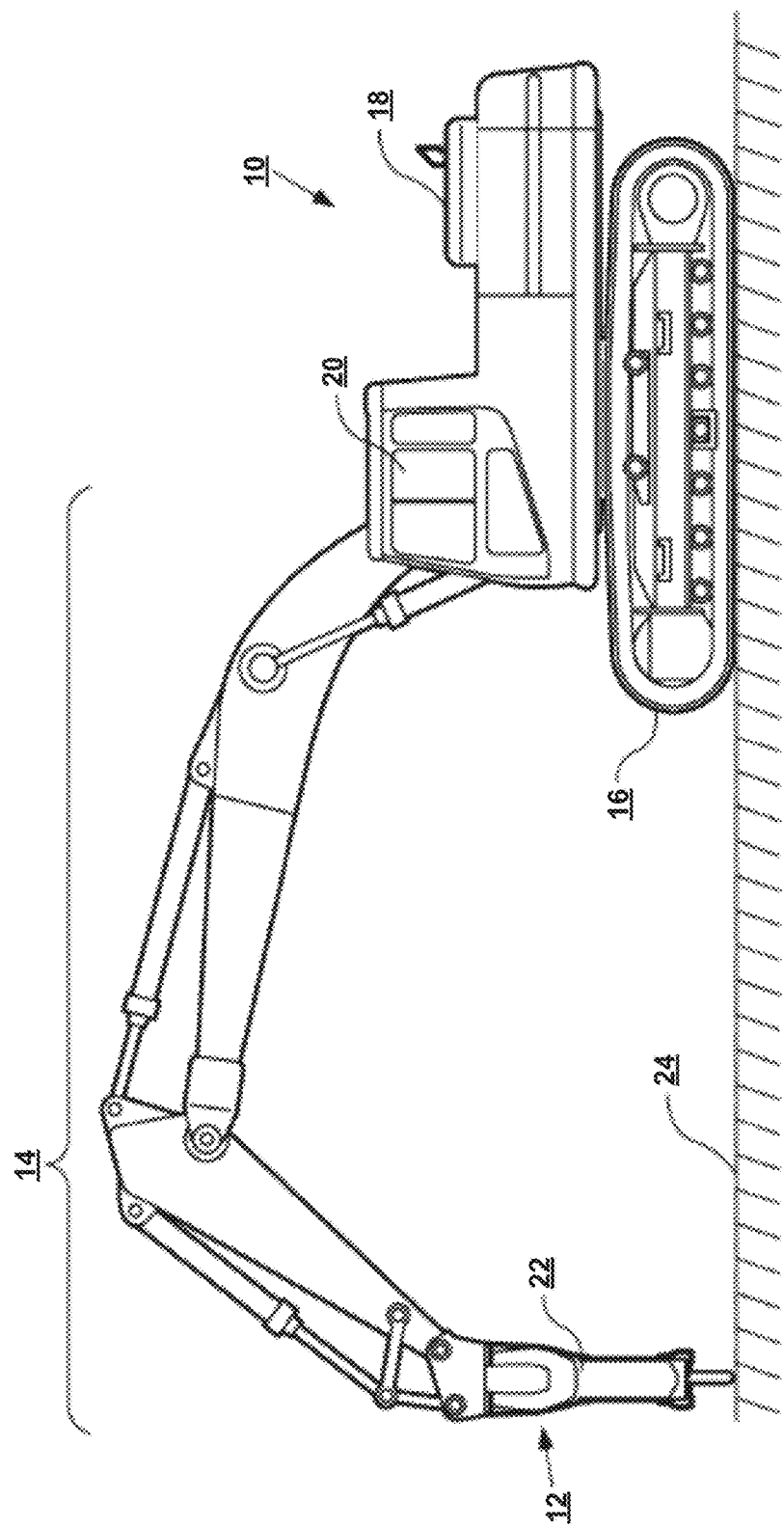
FIG. 1 is a diagram of an example machine that includes a reciprocating hammer.

FIG. 1 is a diagram of an example machine 10 that includes a reciprocating hammer 12. Machine 10 may include a fixed or mobile machine that performs some type of operation associated with an industry, such as mining, construction, farming, transportation, or the like. For example, machine 10 may be an earth moving machine, such as an excavator, a backhoe, a loader, a motor grader, or the like. Machine 10 may include an implement system 14 configured to move reciprocating hammer 12, a drive system 16 for propelling machine 10, a power source 18 that provides power to implement system 14 and drive system 16, and an operator station 20 for operator control of reciprocating hammer 12, implement system 14, and/or drive system 16.

Reciprocating hammer 12 may be attached to implement system 14 of machine 10. For example, reciprocating hammer 12 may be included in an attachment 22 to implement system 14 implement system 14 may include a linkage structure acted on by actuators to move reciprocating hammer 12. The linkage structure of implement system 14 may be complex and may have, for example, three or more degrees of freedom implement system 14 may carry reciprocating hammer 12 for breaking work surface 24 (e.g., a hard object).

Power source 18 may include an engine, such as a diesel engine, a gasoline engine, a gaseous fuel-powered engine, or another type of combustion engine. Additionally, or alternatively, power source 18 may include a non-combustion source of power, such as a fuel cell, a power storage device, or the like. Power source 18 may produce a mechanical output and/or an electrical output, which may be converted to power (e.g., hydraulic power) to control movement of reciprocating hammer 12 and/or implement system 14.

As indicated above, FIG. 1 is provided as an example. Other examples are possible and may differ from what was described in connection with FIG. 1. For example, while reciprocating hammer 12 is described herein as working with machine 10, in some implementations, reciprocating hammer 12 may work with another type of machine, such as a user-operated jackhammer.

Figure 2:
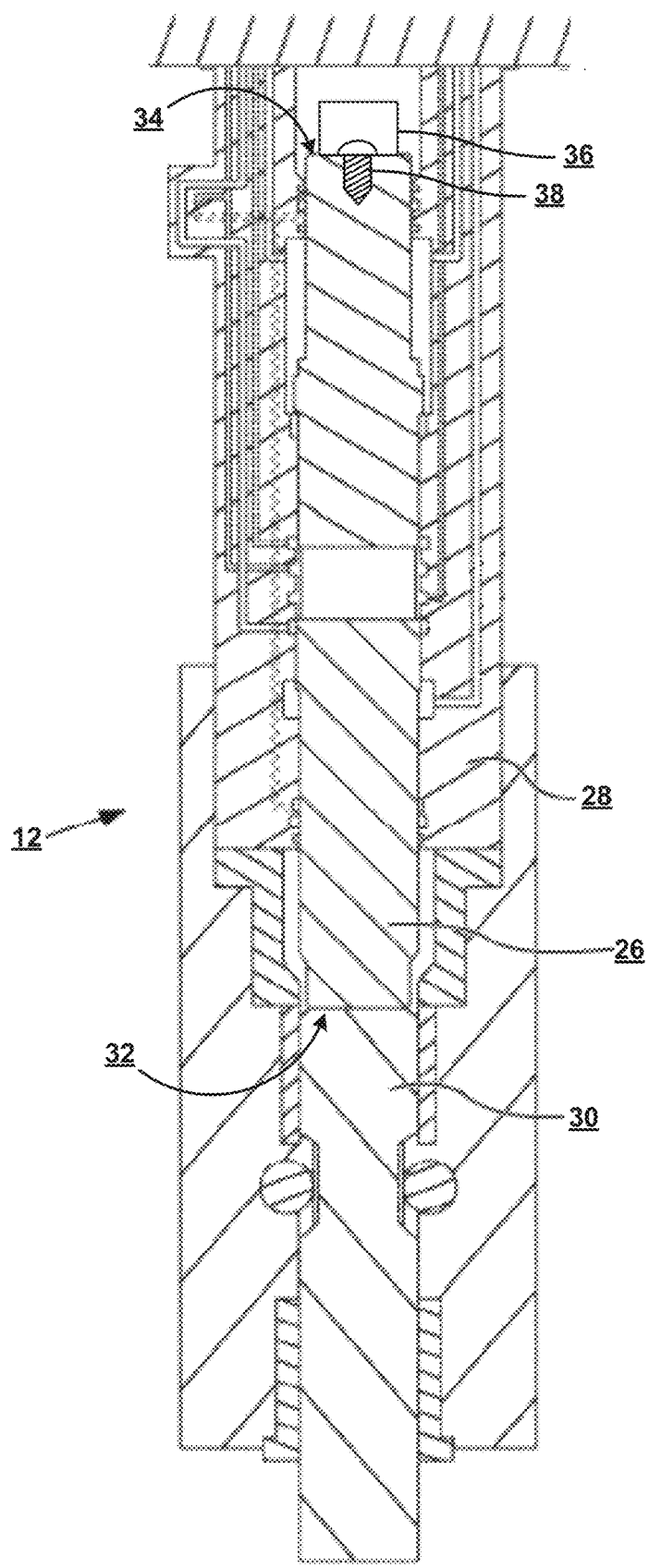
FIG. 2 is a diagram of an example reciprocating hammer that may be used with the machine of FIG. 1.

FIG. 2 is a diagram of an example reciprocating hammer 12 that may be used with machine 10. Reciprocating hammer 12 may include, for example, a hydraulic hammer, a pneumatic hammer, or the like. Reciprocating hammer 12 may include a piston 26 (e.g., a percussion piston) configured for reciprocating movement within a cylinder housing 28 of reciprocating hammer 12. Piston 26 may be configured to contact a work tool 30, such as a chisel or another work tool configured to strike work surface 24 (shown in FIG. 1). For example, piston 26 may have a first end 32 configured to strike work tool 30. Piston 26 may have a second end 34 opposite first end 32.

Reciprocating hammer 12 may include a diagnostic system 36. In some implementations, diagnostic system 36 may be attached to piston 26. For example, diagnostic system 36 may be attached to second end 34 of piston 26. In some implementations, diagnostic system 36 may be attached to piston 26 via an attachment mechanism 38. Attachment mechanism 38 may include a removable attachment, such as a screw, a bolt, or the like, or may include a fixed attachment, such as a welded connection, or the like. Diagnostic system 36 may be attached to piston 26 so that diagnostic system 36 moves with piston 26 as piston 26 reciprocates. This movement may be used to power diagnostic system 36 to measure and/or output a signal indicative of an acceleration of piston 26, as described in more detail below.

As indicated above, FIG. 2 is provided as an example. Other examples are possible and may differ from what was described in connection with FIG. 2.

Figure 3:
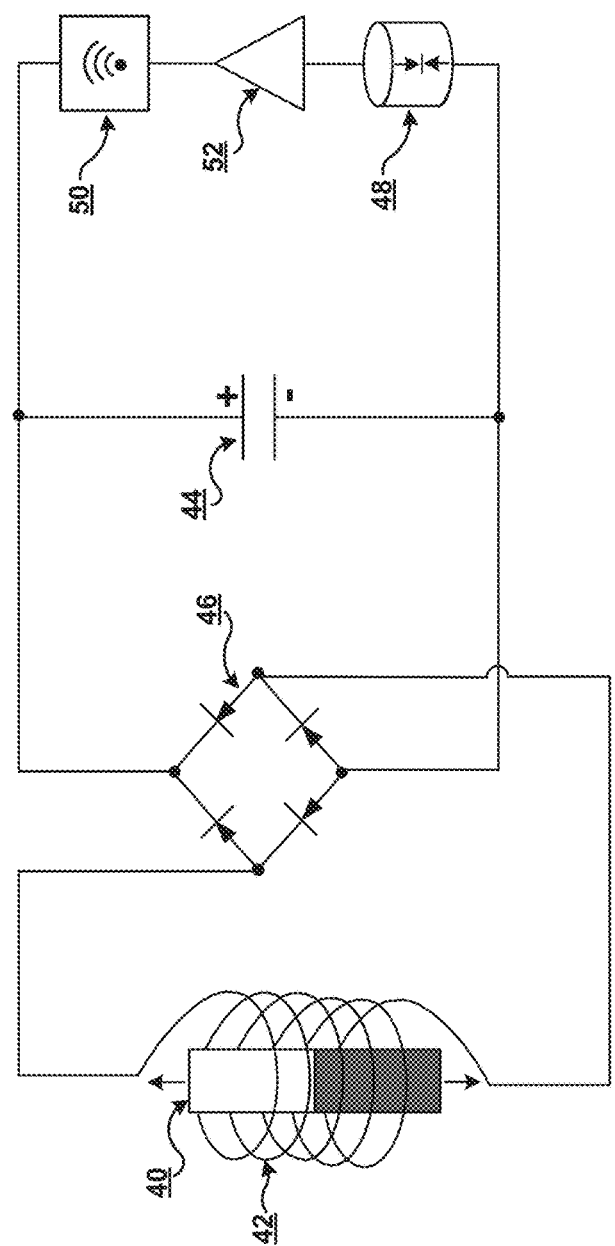
FIG. 3 is a diagram of an example diagnostic system that may be used with the reciprocating hammer of FIG. 2.

FIG. 3 is a diagram of an example diagnostic system 36 that may be used with reciprocating hammer 12. As shown, diagnostic system 36 may include a magnet 40, a conductor 42, an energy storage device 44, a rectifier 46, an accelerometer 48, and/or a communication device 50. Additionally, or alternatively, diagnostic system 36 may include an electronic device 52. Two or more components of diagnostic system 36 may be electrically coupled with one another.

Magnet 40 may include, for example, a bar magnet, a cylindrical magnet, a ring magnet, a magnetic tape, or the like. Conductor 42 may include, for example, a wire, a coil of wire, a solenoid, or the like. Magnet 40 may be configured to induce an electric current, via electromagnetic induction, in conductor 42 based on a movement of piston 26. For example, a reciprocating movement of piston 26 may cause a corresponding movement of magnet 40. Magnet 40 may move relative to conductor 42, which may induce an electric current in conductor 42. Additionally, or alternatively, the reciprocating movement of piston 26 may cause a corresponding movement of conductor 42. Conductor 42 may move relative to magnet 40, which may induce an electric current in conductor 42.

Energy storage device 44 may include, for example, one or more components configured to store electrical energy. For example, energy storage device 44 may include a capacitor, a battery, or the like. Energy storage device 44 may be electrically coupled with conductor 42, and may be configured to receive electric current induced in conductor 42 by magnet 40. In some implementations, energy storage device 44 may store electric power (e.g., an electric charge) based on the induced electric current. Additionally, or alternatively, energy storage device 44 may supply the electric power to one or more components of diagnostic system 36, such as accelerometer 48, communication device 50, electronic device 52, or the like. In some implementations, diagnostic system 36 may include a battery (not shown), which may be charged by energy storage device 44 (e.g., a capacitor), and which may supply power to one or more components of diagnostic system 36.

Rectifier 46 may include one or more components configured to convert alternating current to direct current. For example, rectifier 46 may include one or more diodes, a diode bridge, or the like. Rectifier 46 may be configured to convert alternating current, induced in conductor 42 by magnet 40, into direct current used to charge energy storage device 44.

Accelerometer 48 may include one or more components configured to measure an acceleration associated with piston 26. In some implementations, accelerometer 48 may be electrically coupled with energy storage device 44, and/or may be powered by energy storage device 44. In some implementations, accelerometer 48 may be self-powered based on a movement of piston 26. Accelerometer 48 may generate an acceleration signal indicative of an acceleration of piston 26, and may output the acceleration signal. In some implementations, accelerometer 48 may output the acceleration signal to communication device 50. Additionally, or alternatively, accelerometer 48 may output the acceleration signal to electronic device 52.

In some implementations, diagnostic system 36 may include one or more sensors other than accelerometer 48, or may include one or more sensors in addition to accelerometer 48. For example, diagnostic system 36 may include a pressure sensor (e.g., to measure a hydraulic fluid pressure associated with reciprocating hammer 12), a force sensor (e.g., to measure a force associated with reciprocating hammer 12, such as a force of impact of piston 26), a temperature sensor (e.g., to measure an operating temperature of reciprocating hammer 12), a position sensor, a speed sensor, a moisture sensor, or the like. One or more sensors of diagnostic system 36 may be powered by energy storage device 44. Additionally, or alternatively, one or more sensors of diagnostic system 36 may output a signal to communication device 50 and/or electronic device 52. A signal output by a sensor may be indicative of a parameter measured by the sensor and associated with reciprocating hammer 12 and/or piston 26.

The acceleration signal may indicate, for example, a positive acceleration indicating that piston 26 is increasing velocity over time, a negative acceleration (e.g., a deceleration) indicating that piston 26 is decreasing velocity over time, or a zero acceleration indicating that piston 26 is moving with a constant velocity. In some implementations, accelerometer 48 may be configured to measure an acceleration (e.g., a negative acceleration, or deceleration) of piston 26 as piston 26 strikes work tool 30.

Communication device 50 may include one or more components configured to output a signal (e.g., a wireless signal) based on the acceleration measured by accelerometer 48. For example, communication device 50 may include a wireless communication device, such as a Bluetooth communication device, a near field communication (NFC) device, a Wi-Fi communication device, a wireless local area network (WLAN) communication device, or the like. In some implementations, communication device 50 may output a wireless signal indicative of the acceleration measured by accelerometer 48. In some implementations, communication device 50 may include and/or may be electrically coupled to an amplifier configured to amplify a signal output by communication device 50.

Electronic device 52 may include one or more components configured to modify a signal received from accelerometer 48. In some implementations, electronic device 52 may include an amplifier. In this case, electronic device 52 may amplify a first signal, received from accelerometer 48, to generate a second signal. Electronic device 52 may output the second signal to communication device 50, which may output a signal, indicative of the acceleration, based on the second signal. Additionally, or alternatively, electronic device 52 may include a converter, such as an analog-to-digital converter. In this case, electronic device 52 may convert a first signal (e.g., an analog signal), received from accelerometer 48, to a second signal (e.g., a digital signal). Electronic device 52 may output the second signal to communication device 50, which may output a signal, indicative of the acceleration, based on the second signal. In some implementations, electronic device 52 may include an amplifier and a converter, configured to amplify and convert a signal from accelerometer 48, as described above.

As indicated above, FIG. 3 is provided as an example. Other examples are possible and may differ from what was described in connection with FIG. 3. In some implementations, diagnostic system 36 may include additional components, fewer components, different components, or differently arranged components than those shown in FIG. 3. For example, diagnostic system 36 may not include electronic device 52 in some implementations.

Figure 4:
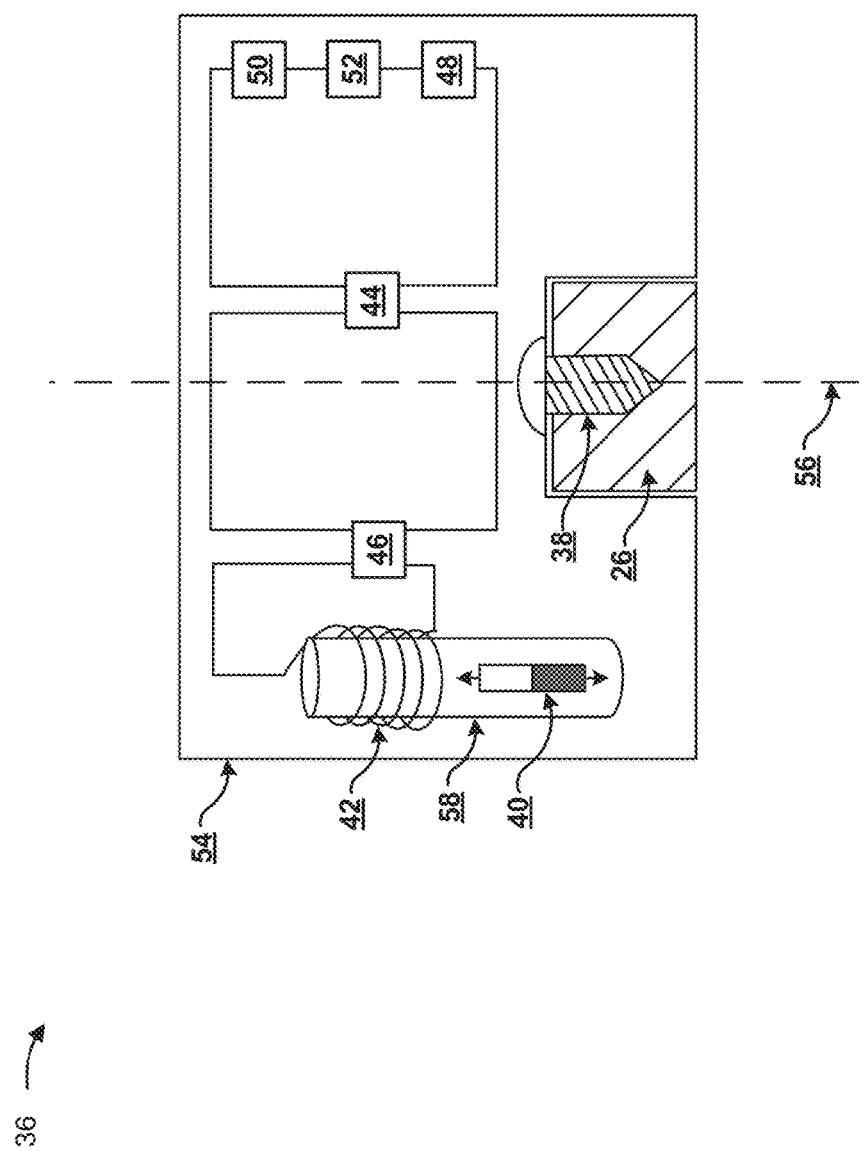
FIG. 4 is a diagram of an example configuration of a diagnostic system that may be used with the reciprocating hammer of FIG. 2.

FIG. 4 is a diagram of an example configuration of diagnostic system 36 that may be used with reciprocating hammer 12. As shown in FIG. 4, one or more components of diagnostic system 36 may be contained within a housing 54. For example, one or more of magnet 40, conductor 42, energy storage device 44, rectifier 46, accelerometer 48, communication device 50, and/or electronic device 52 may be contained within housing 54. In some implementations, one or more of these components may be external to housing 54. As further shown, diagnostic system 36 may be attached to piston 26 via attachment mechanism 38.

As shown in FIG. 4, magnet 40 may be contained within housing 54, in some implementations. Additionally, or alternatively, magnet 40 may be positioned within housing 54 such that magnet 40 moves relative to conductor 42. For example, magnet 40 may be configured for movement substantially parallel to a longitudinal axis 56 of piston 26. In some implementations, magnet 40 may be configured to move freely, or undamped. In some implementations, magnet 40 may be configured for damped movement (e.g., within a fluid). Additionally, or alternatively, magnet 40 may be contained within a magnet housing 58. Magnet housing 58 may be configured to permit movement of magnet 40 (e.g., damped movement, undamped movement, etc.) substantially parallel to longitudinal axis 56.

In some implementations, magnet 40 may be configured to move within housing 54, while conductor 42 may be fixed (e.g., stationary) within housing 54. In some implementations, magnet 40 may be fixed within housing 54, and conductor 42 may be configured to move within housing 54. In either case, a movement of piston 26 causes a movement of housing 54, and also causes a movement of magnet 40 relative to conductor 42, thereby inducing an electric current in conductor 42.

As indicated above, FIG. 4 is provided as an example. Other examples are possible and may differ from what was described in connection with FIG. 4. For example, the size (e.g., the width) of piston 26 relative to the size (e.g., the width) of diagnostic system 36 is provided as an example. In practice, the size (e.g., the width) of piston 26 may be bigger than, the same as, or smaller than the size (e.g., the width) of diagnostic system 36.

Figure 5:
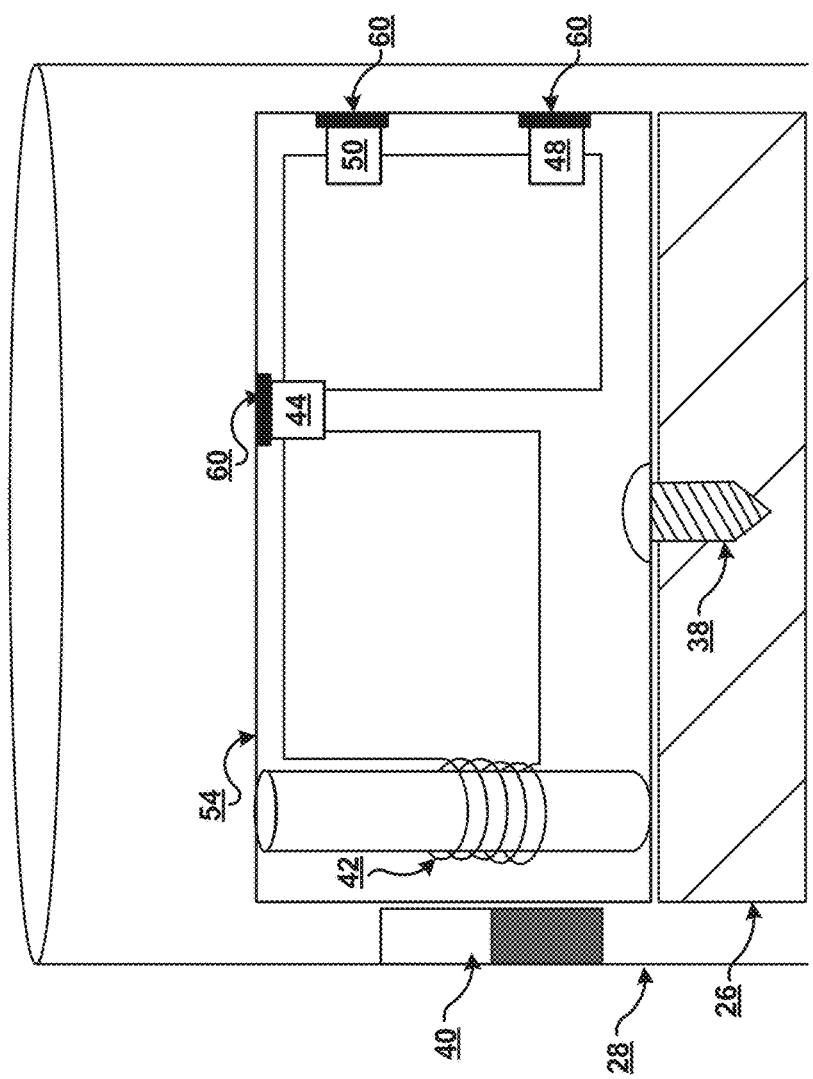
FIG. 5 is a diagram of another example configuration of a diagnostic system that may be used with the reciprocating hammer of FIG. 2.

FIG. 5 is a diagram of another example configuration of diagnostic system 36 that may be used with reciprocating hammer 12. As shown in FIG. 5, magnet 40 may be external to housing 54, in some implementations. For example, magnet 40 may be attached to cylinder housing 28. Additionally, or alternatively, magnet 40 may form a portion of cylinder housing 28. While not shown, conductor 42 may be external to housing 54, in some implementations. For example, conductor 42 may be attached to cylinder housing 28. Additionally, or alternatively, conductor 42 may form a portion of cylinder housing 28. In this way, a movement of piston 26 causes a movement of housing 54, and also causes a movement of conductor 42 relative to magnet 40, thereby inducing an electric current in conductor 42.

In some implementations, one or more components of diagnostic system 36 may be attached to housing 54. For example, magnet 40, conductor 42, energy storage device 44, rectifier 46, accelerometer 48, communication device 50, and/or electronic device 52 may be attached to housing 54. In some implementations, a buffer material 60 may be positioned between a component of diagnostic system 36 and a wall of housing 54. Buffer material 60 may include a material that reduces an effect of vibration or acceleration, such as urethane. As further shown by comparison of FIG. 4 and FIG. 5, housing 54 may have different shapes.

As indicated above, FIG. 5 is provided as an example. Other examples are possible and may differ from what was described in connection with FIG. 5.

Figure 6:
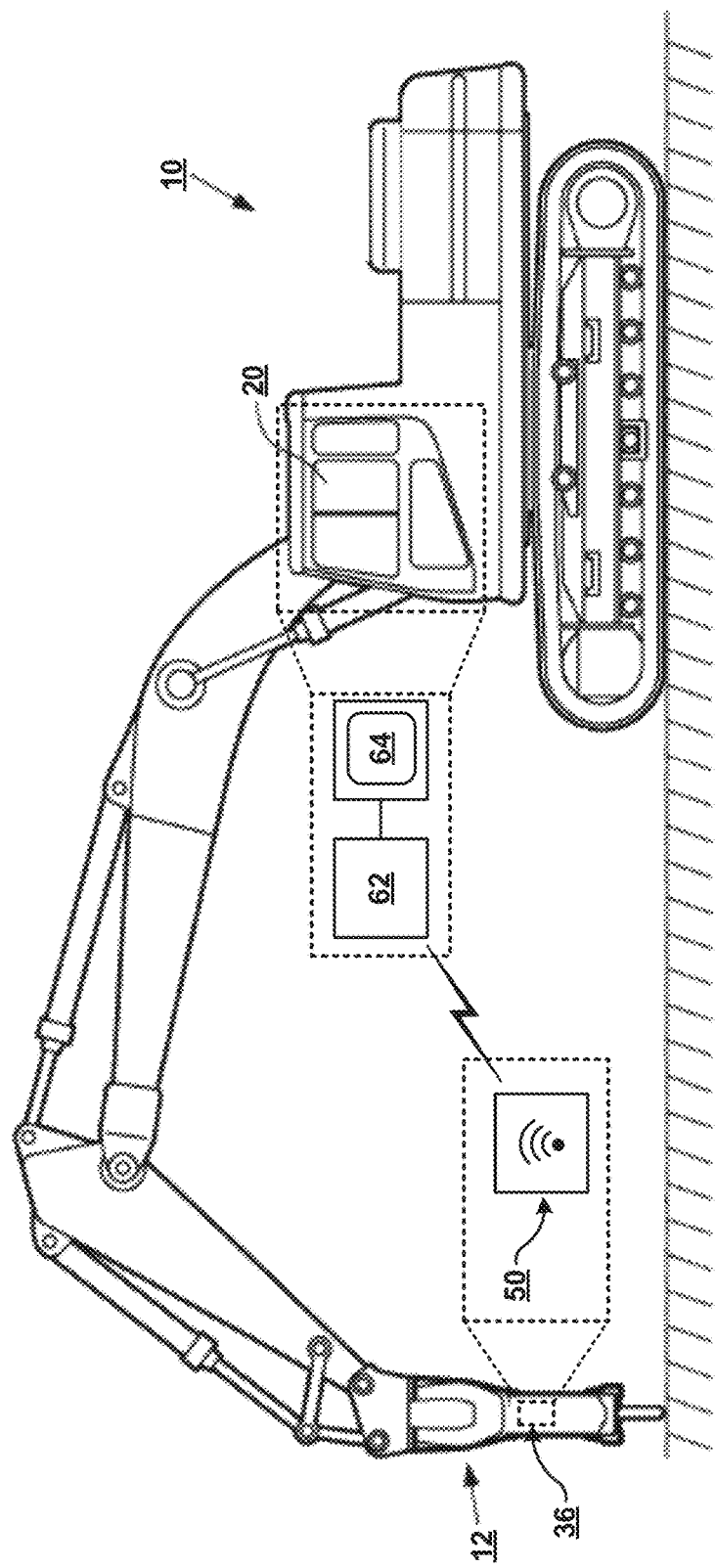
FIG. 6 is a diagram illustrating an example of a manner in which a diagnostic system for a reciprocating hammer may be integrated with the machine of FIG. 1.

FIG. 6 is a diagram illustrating an example of a manner in which diagnostic system 36 for reciprocating hammer 12 may be integrated with machine 10. As shown in FIG. 6, machine 10 may include one or more components that communicate with diagnostic system 36 to provide information associated with operating and/or maintaining reciprocating hammer 12 of machine 10. For example, machine 10 may include a controller 62 and/or one or more interface devices 64. In some implementations, controller 62 and/or interface devices 64 may be included in operator station 20, as shown. As further shown, diagnostic system 36 may be included in reciprocating hammer 12 of machine 10. Diagnostic system 36 may include communication device 50, as described above, which may communicate with controller 62 and/or interface devices 64 via wired and/or wireless connections.

As shown, communication device 50 may communicate with controller 62 via a wireless connection, in some implementations. Communication device 50 may provide, to controller 62, a signal that identifies an acceleration of piston 26 of reciprocating hammer 12. Controller 62 may provide this signal to interface device 64, which may output a visible and/or audible indicator based on the signal. For example, interface device 64 may include a display, a speaker, a warning light, or the like. In some implementations, interface device 64 may output information that identifies the acceleration of piston 26 based on receiving the signal from communication device 50 and/or controller 62. For example, the information may identify an acceleration of piston 26 as piston 26 reciprocates.

Additionally, or alternatively, interface device 64 may output a maintenance alert, associated with reciprocating hammer 12, based on the signal from communication device 50. The maintenance alert may indicate, to an operator of machine 10, that reciprocating hammer 12 is in need of maintenance. In some implementations, controller 62 may receive a first signal (e.g., a wireless signal) from communication device 50, and may receive a second signal. The second signal may include a threshold signal that represents a threshold associated with operating and/or performing maintenance on reciprocating hammer 12. Controller 62 may compare the first signal and the second signal, and may output an alert signal based on a result of comparing the first signal and the second signal (e.g., based on determining that the first signal is greater than or equal to the second signal, based on determining that the first signal is less than or equal to the second signal, etc.). Interface device 64 may receive the alert signal, and may output an alert, associated with operating or maintaining reciprocating hammer 12, based on the alert signal. The alert may indicate, for example, that reciprocating hammer 12 needs maintenance, that reciprocating hammer 12 is operating at a non-optimal angle relative to work surface 24, that a parameter associated with reciprocating hammer 12 is to be adjusted (e.g., a flow rate of hydraulic fluid used to operate reciprocating hammer 12), or the like.

In some implementations, the second signal (e.g., the threshold signal) may be based on a plurality of acceleration values measured by accelerometer 48 of diagnostic system 36. For example, controller 62 may receive a plurality of acceleration values (e.g., over time), and may calculate a threshold value based on the plurality of acceleration values (e.g., an average acceleration value, a moving average acceleration value, a maximum acceleration value, a minimum acceleration value, etc.). Controller 62 may compare this threshold value and an acceleration value received from communication device 50, and may output an alert signal based on the comparison (e.g., when the acceleration value is less than or equal to the threshold value, indicating that reciprocating hammer 12 is in need of maintenance, is operating at a non-optimal angle, is operating at a non-optimal rate, is operating using a non-optimal parameter, etc.).

In some implementations, controller 62 may determine a cycle time associated with piston 26 of reciprocating hammer 12. For example, controller 62 may determine the cycle time based on an amount of time between consecutive measurements of zero acceleration. Controller 62 may receive a signal from communication device 50 when the acceleration value is equal to zero (or substantially zero), and may calculate the cycle time as the amount of time between receiving consecutive signals indicating that the acceleration value is equal to zero. Controller 62 may output an alert signal based on the cycle time (e.g., when the cycle time is greater than or equal to a threshold value, indicating that reciprocating hammer 12 is in need of maintenance or is operating at a non-optimal angle). For example, controller 62 may output the alert signal to interface device 64, and interface device 64 may be configured to output information associated with the cycle time (e.g., to an operator of machine 10).

Controller 62 may include one or more processors (e.g., one or more central processing units) capable of being programmed to perform one or more functions described herein. Controller 62 may be implemented in hardware, firmware, or a combination of hardware and software. Additionally, or alternatively, controller 62 may include a memory, a secondary storage device, an input component, an output component, a communication interface for interacting with external devices, or any other component for accomplishing tasks consistent with the present disclosure. In some implementations, controller 62 may execute one or more instructions, stored by a non-transitory computer-readable medium, to perform the functions described herein.

As indicated above, FIG. 6 is provided as an example. Other examples are possible and may differ from what was described with regard to FIG. 6.

INDUSTRIAL APPLICABILITY

The disclosed diagnostic system 36 may be used with any reciprocating hammer 12 where proper maintenance and/or operation is desired, such as a reciprocating hammer 12 used with an excavator, a backhoe, a jackhammer, or the like. The disclosed diagnostic system 36 may provide information for determining when to perform maintenance on reciprocating hammer 12 and/or when to change an angle of operation of reciprocating hammer 12. Diagnostic system 36 may output information regarding an acceleration of piston 26 of reciprocating hammer 12. Controller 62 may compare the acceleration to a threshold value, and may determine whether to output an alert based on a result of the comparison. Additionally, or alternatively, controller 62 may perform one or more calculations based on a received acceleration signal, and may determine whether to output the alert based on the one or more calculations. The alert may indicate, to an operator of reciprocating hammer 12, that reciprocating hammer 12 is in need of maintenance, that reciprocating hammer 12 is operating at a non-optimal angle, a non-optimal rate, or the like. Operation of diagnostic system 36 will now be explained.

During operation of reciprocating hammer 12, piston 26 may repeatedly strike work tool 30, which may in turn strike and break up a hard material, such as stone, rock, concrete, asphalt, or the like. Over time, operation of reciprocating hammer 12 may cause various components of reciprocating hammer 12 to wear down, such as piston 26, work tool 30, a hydraulic or pneumatic system that causes reciprocating movement of piston 26, or the like. Thus, reciprocating hammer 12 may need maintenance. Proper maintenance may ensure that reciprocating hammer 12 operates effectively during the expected lifetime of reciprocating hammer 12. If maintenance operations are not performed, reciprocating hammer 12 may be subject to repeated failures, premature wearing, and a shortened useful life, which may increase repair costs, interrupt normal usage, and increase the likelihood of accidents.

In some cases, maintenance of reciprocating hammer 12 may be performed periodically based on a predetermined maintenance schedule. This maintenance schedule may be based on, for example, a predetermined time period, a number of operating hours of reciprocating hammer 12, or the like. However, such a maintenance schedule may not take into account the differences between individual reciprocating hammers 12, operating conditions in which reciprocating hammers 12 are used, or the skill level of an operator that uses reciprocating hammer 12 implementations described herein use the actual performance of reciprocating hammer 12, as indicated by an acceleration of piston 26 of reciprocating hammer 12, to determine when maintenance should be performed on reciprocating hammer 12 and to provide an indication that such maintenance should be performed.

For example, during operation of reciprocating hammer 12, piston 26 may undergo reciprocating movement due to forces exerted on piston 26 (e.g., hydraulic forces, pneumatic forces, etc.). Such reciprocating movement may cause a corresponding reciprocating movement of diagnostic system 36, which may be attached to piston 26. The reciprocating movement of diagnostic system 36 may cause magnet 40 and conductor 42 to move relative to one another, which may induce a current in conductor 42 via electromagnetic induction. This current may be rectified by rectifier 46 (e.g., to produce a direct current from an alternating current), and may flow to energy storage device 44. The current may charge energy storage device 44, which may store electrical energy and use the stored electrical energy to power one or more components of diagnostic system 36. In this way, diagnostic system 36 may be self-powered based on the reciprocating movement of piston 26, and may not need an external power source to measure an acceleration of piston 26.

In some implementations, energy storage device 44 may power accelerometer 48. Accelerometer 48 may measure an acceleration of piston 26 (e.g., as piston 26 strikes work tool 30), and may output a first signal indicative of the acceleration. Communication device 50 may receive the first signal, and may output a second signal indicative of the acceleration. In some implementations, the first signal may be a wired signal. Additionally, or alternatively, the second signal may be a wireless signal. In this way, communication device 50 may communicate with controller 62 and/or interface device 64, external from diagnostic system 36, to provide information indicative of the acceleration and/or an alert determined based on the acceleration.

In some implementations, controller 62 may receive the information indicative of the acceleration, and may output information that assists an operator of machine 10 and/or reciprocating hammer 12 with determining whether to perform maintenance on reciprocating hammer 12. For example, controller 62 may provide information that identifies the acceleration to interface device 64, and interface device 64 may display information that identifies an acceleration value that represents the acceleration. An operator may observe the acceleration value, and may determine, as reciprocating hammer 12 is being operated, whether reciprocating hammer 12 needs maintenance.

Additionally, or alternatively, controller 62 may determine whether to provide a maintenance alert based on the acceleration. For example, controller 62 may compare an acceleration value, indicative of the acceleration of piston 26, to a threshold value. If the acceleration value satisfies the threshold value (e.g., is less than or equal to the threshold value, indicating that reciprocating hammer 12 needs maintenance), then controller 62 may output a maintenance alert. The maintenance alert may be provided, for example, to interface device 64, which may output the maintenance alert as a visible signal, an audible signal, or the like. In this way, an operator may be alerted as to the need for maintenance, and may take appropriate action in real time, as reciprocating hammer 12 is being operated.

In some implementations, controller 62 may perform a calculation using a plurality of acceleration values received from communication device 50. Controller 62 may use the resulting calculated value to determine whether to provide a maintenance alert. For example, the calculated value may represent an average acceleration value, and controller 62 may compare the average acceleration value to a threshold value, as described above. As another example, controller 62 may calculate a cycle time of piston 26, and may compare the cycle time to a threshold value. Based on one or more of these comparisons, controller 62 may provide a maintenance alert to interface device 64. In this way, an operator may be alerted as to the need for maintenance, and may take appropriate action.

Additionally, or alternatively, one or more of the alerts described above may be related to an angle of operation of reciprocating hammer 12 relative to work surface 24. For example, piston 26 may undergo a greater acceleration when operating at a more effective angle of operation, and may undergo a lesser acceleration when operating at a less effective angle. Thus, an operator of reciprocating hammer 12 may use the alert to adjust an angle of operation of reciprocating hammer 12. When operating at a more effective angle, wear on components of reciprocating hammer 12 may be reduced, and an operating life of reciprocating hammer 12 may be extended.

Several advantages may be associated with the disclosed diagnostic system 36. For example, diagnostic system 36 may be self-powered via electromagnetic induction due to a reciprocating movement of piston 26. Thus, diagnostic system 36 may not need replacement or recharging due to a spent power source, such as would be the case with a battery-powered system. Furthermore, diagnostic system 36 may not need wires connected to a power source external to diagnostic system 36. Thus, diagnostic system 36 may not be rendered inoperable as a result of damage to a wire due to an operating condition of reciprocating hammer 12. In this way, the self-powered diagnostic system 36 disclosed herein may be more reliable, more effective, and less costly than other diagnostic systems.

Furthermore, diagnostic system 36 may communicate with controller 62 and/or interface device 64 of machine 10 via a wireless connection. This may eliminate the need for external wiring that connects diagnostic system 36 to controller 62 and/or interface device 64. Such wiring may be broken or rendered inoperable due to an operating condition of reciprocating hammer 12. In this way, diagnostic system 36 disclosed herein may be more reliable, more effective, and less costly than other diagnostic systems. Furthermore, an operator of reciprocating hammer 12 may be notified in real time (e.g., as reciprocating hammer 12 is being operated) when reciprocating hammer 12 needs maintenance. This may prevent further wear on reciprocating hammer 12, may prevent catastrophic failure of reciprocating hammer 12.

Still further, diagnostic system 36 may more accurately indicate a need for maintenance than a traditional maintenance schedule. Using an acceleration of piston 26 as an indicator for maintenance takes into account the actual strain and/or wear on piston 26 and reciprocating hammer 12, which is more difficult to take into account using a traditional maintenance schedule or an operator's experience. In some cases, reciprocating hammer 12 may be seriously damaged, and measuring the acceleration of piston 26 may permit reciprocating hammer 12 to be repaired. In this case, reciprocating hammer 12 may be damaged beyond repair if maintenance is only performed at regularly scheduled intervals. Thus, diagnostic system 36 may increase the likelihood that maintenance of reciprocating hammer 12 is performed at appropriate times with increased accuracy and reduced cost.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents.

What is claimed is:
1. A reciprocating hammer, comprising:
 a piston configured for reciprocating movement within a cylinder housing;
 a magnet configured to move relative to a conductor and to induce, via electromagnetic induction and based on the reciprocating movement of the piston, an electric current in the conductor;
 an energy storage device electrically coupled with the conductor and configured to store electrical energy based on the electric current induced by the magnet;
 a sensor configured to measure a parameter associated with the reciprocating hammer;
 a communication device electrically coupled with the energy storage device and configured to output a signal indicative of the parameter; and
 wherein the magnet, energy storage device, sensor, and communication device are attached to the piston such that they move with the piston during reciprocating movement.

2. The reciprocating hammer of claim 1, wherein the magnet, energy storage device, sensor, and communication device are removably attached to the piston.

3. The reciprocating hammer of claim 1, wherein the piston has a first end, configured to strike a work tool, and a second end opposite the first end; and
 wherein the magnet, energy storage device, sensor, and communication device are attached to the second end of the piston.

4. The reciprocating hammer of claim 1, wherein the sensor is an accelerometer configured to measure acceleration of the piston.

5. The reciprocating hammer of claim 1, wherein the energy storage device comprises a capacitor.

6. The reciprocating hammer of claim 1, further comprising a rectifier that electrically couples the conductor and the energy storage device.

7. The reciprocating hammer of claim 1, further comprising an amplifier configured to amplify the signal indicative of the parameter.

8. A diagnostic system, comprising:
 a magnet configured to move relative to a conductor and to induce, via electromagnetic induction and based on a reciprocating movement of a piston, an electric current in the conductor;
 an energy storage device electrically coupled to the conductor and configured to store electrical energy based on the electric current induced by the magnet;
 a sensor configured to measure a parameter associated with the piston;
 a communication device powered by the energy storage device and configured to output a wireless signal indicative of the parameter associated with the piston; and
 wherein the diagnostic system is attached to the piston such that it moves with the piston during reciprocating movement.

9. The diagnostic system of claim 8, further comprising an interface device configured to:
 receive the wireless signal from the communication device; and
 output information that identifies the parameter associated with the piston based on receiving the wireless signal.

10. The diagnostic system of claim 8, further comprising an interface device configured to:
 receive the wireless signal from the communication device; and
 output an alert, associated with the piston, based on the wireless signal.

11. The diagnostic system of claim 8, further comprising:
 a controller configured to:

receive the wireless signal;
compare the wireless signal and a threshold signal indicative of a threshold associated with operating or maintaining the piston; and
output an alert signal based on a result of comparing the wireless signal and the threshold signal; and
an interface device configured to output an alert, associated with operating or maintaining the piston, based on the alert signal.

12. The diagnostic system of claim 11, wherein the threshold signal is based on a plurality of values measured by the sensor.

13. The diagnostic system of claim 8, further comprising:
a controller configured to:
receive the wireless signal; and
determine a cycle time, associated with the piston, based on the wireless signal; and
an interface device configured to output information associated with the cycle time.

14. A diagnostic system for a reciprocating hammer that includes a piston, the diagnostic system comprising:
a magnet configured to move relative to a conductor and to induce, via electromagnetic induction and based on a movement of the piston, an electric current in a conductor;
a capacitor electrically coupled to the conductor and configured to store electric power based on the electric current induced by the magnet;
an accelerometer configured to measure an acceleration of the piston;
a communication device powered by the capacitor and configured to output a signal that identifies the acceleration measured by the accelerometer; and
wherein the diagnostic system is attached to the piston such that it moves with the piston during reciprocating movement.

15. The diagnostic system of claim 14, further comprising an electronic device powered by the capacitor and configured to:
receive, from the accelerometer, a first signal indicative of the acceleration measured by the accelerometer;
generate a second signal based on the first signal; and
output the second signal to the communication device.

16. The diagnostic system of claim 15, wherein the electronic device comprises an amplifier configured to amplify the first signal to generate the second signal.

17. The diagnostic system of claim 15, wherein the first signal comprises an analog signal and the second signal comprises a digital signal; and
wherein the electronic device comprises a converter configured to convert the analog signal to the digital signal.

18. The diagnostic system of claim 14, wherein the accelerometer is powered by the capacitor.

* * * * *